United States Patent
Cox et al.

(10) Patent No.: US 7,092,106 B2
(45) Date of Patent: Aug. 15, 2006

(54) SYSTEM FOR DETERMINING THE CONFIGURATION OF OBSCURED STRUCTURE BY EMPLOYING PHASE PROFILOMETRY AND METHOD OF USE THEREFOR

(75) Inventors: Cary B. Cox, Clinton, MS (US); James A. Evans, Tallulah, LA (US); Charles R. Welch, Vicksburg, MS (US); Barry W. McCleave, Vicksburg, MS (US); Lewis B. Smithhart, Utica, MS (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 333 days.

(21) Appl. No.: 10/713,793

(22) Filed: Nov. 17, 2003

(65) Prior Publication Data

US 2006/0114477 A1    Jun. 1, 2006

Related U.S. Application Data

(63) Continuation-in-part of application No. 10/318,214, filed on Dec. 13, 2002, now abandoned.

(51) Int. Cl.
*G01B 11/24* (2006.01)
(52) U.S. Cl. .................... 356/602; 356/601
(58) Field of Classification Search ............... 356/602, 356/601, 608
See application file for complete search history.

(56) References Cited

U.S. PATENT DOCUMENTS

| | | | |
|---|---|---|---|
| 3,976,382 A * | 8/1976 | Westby | 356/606 |
| 4,969,707 A | 11/1990 | Hopkins | |
| 5,446,291 A | 8/1995 | Becker et al. | |
| 5,619,370 A | 4/1997 | Guinosso | |
| 5,750,069 A | 5/1998 | Lew et al. | |
| 6,198,987 B1 | 3/2001 | Park et al. | |
| 6,403,966 B1 | 6/2002 | Oka | |

* cited by examiner

*Primary Examiner*—Hwa (Andrew) Lee
*Assistant Examiner*—Roy M. Punnoose
(74) *Attorney, Agent, or Firm*—Earl H. Baugher, Jr.

(57) ABSTRACT

An application of phase profilometry to determine the 3-D configuration of normally obscured structure. In one application, the undercarriage of a vehicle is captured in a 3-D profile while the vehicle is operating normally. The system may use a digital camera; a computer for control, communications, processing, comparing configurations and database storage; a broadband light source; and a device positioned between the light and structure that enables an alternating strip or strips of light and shadows to impinge the obscured surface. A preferred embodiment uses a single straight edge as the device. In addition to profiling the undercarriage of a vehicle and comparing it to an expected configuration of a like vehicle, the system may be used for such diverse applications as determination of correct toll at toll booths, quality inspection in an assembly line, safety and security inspections, and access control.

27 Claims, 3 Drawing Sheets

SYSTEM FOR DETERMINING THE CONFIGURATION OF OBSCURED STRUCTURE BY EMPLOYING PHASE PROFILOMETRY AND METHOD OF USE THEREFOR

RELATED INVENTIONS

This is a Continuation-in-Part of prior U.S. patent application Ser. No. 10/318,214, *Systems, and Methods of Use, Employing Distorted Patterns to Ascertain the Shape of a Surface, for Road or Runway Profiling, or as Input to Control Pro-Active Suspension Systems*, by Cox et al., filed Dec. 13, 2002, since abandoned, and incorporated herein by reference.

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest in any patent granted thereon by the United States. This and related patents are available for licensing. Please contact Phillip Stewart at 601 634-4113.

FIELD OF THE INVENTION

The 3-D configuration of obscured structure is determined while the structure is adjacent an installed embodiment of the invention and compared to a database of 3-D representations of like structure. In particular, the system profiles vehicle undercarriages to determine configuration and may be used to determine if something has been added, such as explosives, weapons, infiltrators or contraband.

BACKGROUND

In many countries a typical method of facilitating terrorism involves attaching explosives, infiltrators or weapons to a vehicle's undercarriage. The vehicles then attempt to enter secure areas such as military bases, embassies and other government installations. Often, entry controllers are required to inspect the undercarriage of vehicles to detect such undesirable embellishments.

Conventional inspection systems include mirrors mounted on shafts to be extended under the vehicles and video cameras mounted on shafts with monitors attached to the entry controller's head gear or nearby monitoring stations having additional security personnel. Other systems use fixed cameras mounted on the underside of a ramp over which the vehicles pass. Some systems require the vehicle to stop in a prescribed location while motor driven cameras traverse the length of the vehicle. In each of the cases using cameras at least one inspector views each resulting image. There are also some patents covering like types of systems for determining what is traveling along a road.

U.S. Pat. No. 5,446,291, *Method for Classifying Vehicles Passing a Predetermined Waypoint*, to Becker et al., Aug. 29, 1995, uses a complex electronic sensor and processing system for military reconnaissance to measure speed, distance, and number of axles to classify vehicles to correlate to a database of military vehicles. An image is not taken of the undercarriage of the vehicles.

U.S. Pat. No. 5,750,069, *Method and Apparatus for Discriminating Vehicle Types*, to Lew et al., May 12, 1998, details a technique for identifying a vehicle's type by measuring the pressure imposed by a vehicle's tires on a contact board(s) in the roadway. The system measures the width of the tires, the distance between tires and the number of axles. An image is not taken of the undercarriage of the vehicles.

Often, automated inspection systems are degraded by distortion introduced in the detector(s) used to collect images. Distortion includes that produced by "contrasts" resultant from projections of electromagnetic energy, e.g., shadows, not necessarily visible, induced by light (or other electromagnetic energy) projected onto an irregular or contoured surface. This type of distortion is actually used as a beneficial consequence in preferred embodiments of the present invention. Processing of this "distorted" data after collection of suitable reflections of this energy at a pre-specified sampling rate, to include an optional FFT conversion of digital data and implementation of a simple algorithm, provides the "third dimension" absent in a conventional analog or digital representation of the surface. As an example of one application of the present invention, a suite of simple commercial-off-the-shelf (COTS) hardware may be used to determine a 3-D undercarriage configuration as a vehicle passes over the illumination/detection portion of the present invention that is embedded in or below the roadway.

SUMMARY

Provided in a preferred embodiment of the present invention is a method and necessary apparatus for determining in near real time the 3-D configuration of obscured structure, comparing the result to a database of 3-D configurations of like or "expected" structure of interest and outputting the results of the comparison to a decision maker that may be a machine. It uses a collector positioned off-axis from a source of electromagnetic energy directed at the surface of the structure, a system controller, and a data processor, such as a computer that may also serve as the controller, a display, and a communications device. A single computer may store the database and process data that is input from the collection sub-system or multiple computers may be used to provide redundancy in those applications where downtime must be minimized or avoided.

An alternative to actually taking photographs and having to rely on human interpretation involves the use of a technique termed phase or shadow profilometry together with an automated or semi-automated inspection and alerting system. Conventional phase profilometry capitalizes on the distortion introduced by periodic contrasts, such as shadows cast by light impinging a grid similar to a Venetian blind. In one embodiment, phase or shadow profilometry is enabled through the use of broadband light as passed through a grid, such as a Ronchi grid, thus illuminating the irregular or contoured surface to be profiled in 3-D. Reflections from this surface are viewed by an observer or a collector off-axis from the source of illumination as distorted contrasts, i.e., conventional shadows alternating with bands of light if the impinging energy is light. Thus, rather than simply projecting broadband or monochromatic light, broadband light is projected through suitable means to enable illumination as specific images, i.e., shadow "bars," "bands," or "lines," impinging upon a targeted surface. These specific images may include one or more simple bands, or bars, of light as directed through a slit or grid.

To further facilitate automation of the inspection/alerting process, the Fourier Transform may be applied. One of the advantages of using the Fourier Transform or Fast Fourier Transform (FFT) in conjunction with phase profilometry, i.e., Fourier Transform Profilometry (FTP), lies in the ease of computer processing of the resultant transformation for subsequent use. Prior to this discovery, scientists were using methods that provided a moiré analyses suitable for use by human observers rather than for computer processing. Further, either FTP or simple phase profilometry provide much higher sensitivity than conventional moiré techniques, detecting variations much less than one contour fringe in moiré topography. A specific application of FTP used in a preferred embodiment of the present invention uses the shadow cast by a simple straight edge to develop a profile of the instantaneous contour, thus it may be termed "shadow profilometry."

The FTP technique uses Fast Fourier Transforms of the digital image, filters the data around the fundamental spectral frequency of the grid transverse to the grid lines, and uses complex arithmetic to extract changes in the phase of the grid lines. Processing each frame yields an ordered triplet {x,y,z} for each pixel in the return. This information may be displayed as mesh or contour plots, or may be archived for later analysis. Refer to FIG. 4 for an example based on FTP profiling of a conventional, i.e., unmodified, undercarriage of a truck.

A simple hardware setup may be used to implement phase profilometry as used in a preferred embodiment of the present invention. For example, data collection may be provided via an imager such as a camera, preferably a digital camera, or a synthetic aperture radar (SAR). The complete imager need not be co-located at the pick-up point but may be linked to an objective lens or other detector via suitable means such as a fiber optic cable, coaxial cable, or via wireless transmissions. Illumination of the structure to be profiled may be by a simple non-coherent light source such as a conventional slide projector, or even by re-directing a natural source of light such as the sun or moon, through a slit or grid, via a mirror, if necessary. Additional equipment, including COTS devices, such as a personal computer or a laptop, may be used to store a database, automate the collection and subsequent analyses, communicate with other systems, and control operation of the system.

The method comprising a preferred embodiment of the present invention involves:

establishing at least one contrasting portion of electromagnetic energy on an obscured side of structure by utilizing projection of electromagnetic energy from the source and at least one device to modulate the projection;

in its simplest form, moving the obscured portion of structure over the source and device in one direction at a time (or conversely moving the source and device over the obscured portion of structure), thus producing a distorted portion of reflected electromagnetic energy from the surface wherever the surface is not flat in a plane parallel to the direction of movement of the structure;

using at least one collector, such as a camera, off-axis from the source, for receiving reflections from the surface of the obscured portion of the structure where if the source and device are moved, the collector may need to be moved in consonance with them to maintain proper geometrical relationships;

using a pre-specified algorithm, processing at a pre-specified sampling rate the reflections, e.g., the band(s) of shadow alternated with bands of light imaged on the surface, to include those that are distorted by vertical variations in the surface of the obscured portion of structure;

comparing the resulting 3-D image with a database of known 3-D configurations of obscured portions of like structure; and providing the results of this comparison to a decision maker in near real time.

The source may provide electromagnetic energy that operates within wavelengths incorporating any of: radar frequencies, radio frequencies (RF), non-coherent visible light, non-coherent infrared (IR) light, non-coherent ultraviolet (UV) light, coherent visible light, coherent infrared (IR) light, coherent ultraviolet (UV) light, and any combination thereof. The contrasting portion may be a shadow, the edge of which is used by the pre-specified algorithm to compare to images of the illuminated surface that are not distorted, thus yielding height information. In one embodiment the imager used is a digital camera.

The device may be a simple construct that directs light or other electromagnetic energy so that one or more strips of energy impinge on at least parts of the obscured portion of the moving structure. Each strip may be longer in one dimension than its other dimension as described by its image on the structure. The strip of energy may be projected so as to be either parallel or non-parallel to the direction of movement of the structure as it is being "imaged."

The processing incorporated in the method of a preferred embodiment of he present invention may entail:

converting collected analog data to digital format;

performing a Fast Fourier Transform (FFT) of any reflections to yield FFT data;

filtering the resultant FFT data about the fundamental spectral frequency of the projected electromagnetic energy in the direction transverse to the direction of movement of the structure;

employing complex algorithms to extract changes in phase of the reflected electromagnetic energy;

using the results from the complex algorithms, constructing a vertical profile to complete the 3-D configuration; and comparing said complete 3-D configuration to known expected 3-D configurations contained in a database.

Some practical applications of automated or semi-automated near real time phase profilometry that may employ this method include:

inspecting vehicles delivering goods to secured areas for contraband, weapons or explosives;

inspecting vehicles for undercarriage damage;

inspecting trucks leaving manufacturing areas for stolen material;

inspecting the underside of manufactured goods on an assembly line; and inspecting vehicles leaving prisons to foil escapes.

In one configuration, the collection equipment configuration that facilitated the imaging of 3-D configurations comprised a simple digital camera and a slide projector that projected a grid such as the well known periodic Ronchi pattern. A periodic pattern is not required to achieve desired results using a preferred embodiment of the present invention. For example, a single simple shadow of a straight edge, e.g., a visible line shadow, cast using a light slit having a bar interposed between the slit and the obscured surface of the structure may suffice to provide the distortion needed for comparison to an expected 3-D representation as stored in a database.

Using the edge of this shadow provides the necessary contrast (as well as distortion) for use in phase profilometry. This edge is essentially a 2-D line that is simple to process. In all cases, a 3-D profile is deduced by taking the distorted patterns, e.g., visible shadows in the case of visible light projection, and interrelating these with the undistorted patterns such as that provided by direct on-axis views of the surface by a camera, or those had by theoretical modeling to predict the undistorted shadows. Coupling the above simple collection devices with inexpensive powerful digital signal processors (DSPs) and laptop personal computers (PCs) providing considerable data storage enables a robust portable package suitable for use in military, security, recreation, industrial, or construction applications.

Advantages of a specific embodiment of the present invention include:
- inexpensive hardware and software to implement;
- simple to operate, lending itself to semi-autonomous operation when collecting data for use by security personnel or for further analysis and autonomous operation when used with an automated decision making system;
- readily upgradeable to capitalize on newest technology and lower device costs;
- available as a robust installation for military, security, construction, industrial, or recreational uses;
- easily maintained;
- adaptable to multiple applications;
- inherently safe since a preferred embodiment need not use laser light or high-power electrical systems;
- inherently accurate; and
- useful as a testing tool as well as a security control device.

What is needed is a simple, robust, unobtrusive, inexpensive system able to profile an object, such as the undercarriage of a vehicle, moving adjacent or over the illuminator/detector part of the system. This profile must then be compared to an "expected" like profile in a database accessed by the system. Notices of differences in the measured profile must be sent in near real time to a user for further action. The user may be a person or another system. It may be capable of passive operation, i.e., it emits no energy. Although a certain precision of measurement is desirable, a useful embodiment may provide a simple relative measure of changes in surface profile. One or more specific embodiments of the present invention provide solutions to these needs.

DETAILED DESCRIPTION

Figure 1:
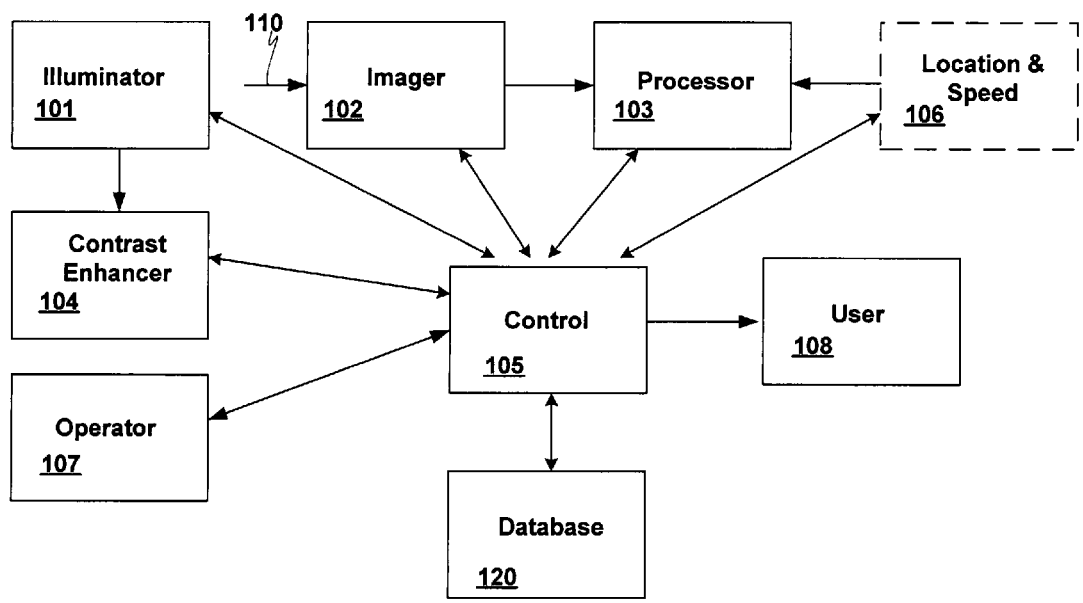
FIG. 1 is a block diagram of a preferred embodiment of the present invention.
Figure 4:
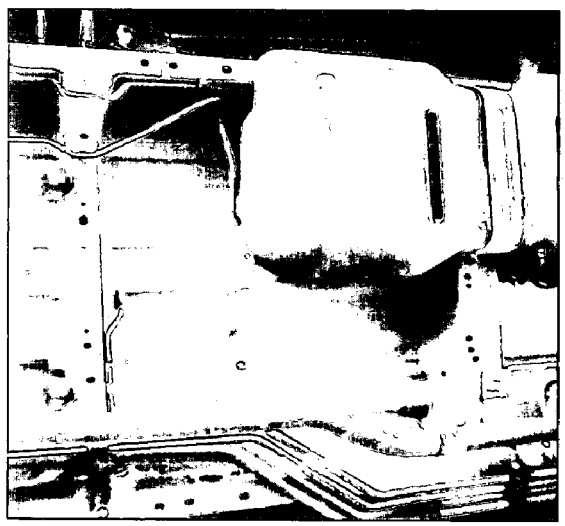
FIG. 4 is a 3-D representation of the undercarriage of a truck accomplished using a preferred embodiment of the present invention.

Refer to FIG. 1. A preferred embodiment of the present invention capitalizes on positioning an object, hereafter referred to as a contrast enhancer 104, between an active energy source, hereafter an illuminator 101, and a contoured or irregular surface to be profiled, such as the undercarriage of a vehicle as shown in FIG. 4, while collecting reflected energy 110 from that surface with an imager 102. The illumination source 101 may be a manmade device or a natural source such as the sun, moon, or reflections therefrom. The reflected energy 110 from the irregular or contoured surface may reside in any frequency or combination of frequencies within the electromagnetic spectrum to include ultraviolet, infrared, visible light, radar, or radio frequencies (RF). The contrast enhancer 104 distorts energy emitted from the energy source that would otherwise project unimpeded onto the surface of interest. Thus a pattern is displayed on the surface, e.g., a series of light and dark parallel bars. The contrast enhancer 104 may be a separate device able to be controlled by the control 105 or part of an existing apparatus appropriately positioned in advance of image (data) collection. In a preferred embodiment, the collected energy 110 is processed by a processor 103 that is controlled by a control 105 that may be operated by an operator 107 who also may be a user. The collected energy may be processed in near real time to yield a 3-D profile of the surface for output from the control 105 to a user 108 or the operator 107. The user 108 or operator 107 may be a security controller, product inspector, or an engineer charged with production quality control. Further, the user 108 may be a system that automatically outputs suitable warnings to facilitate further action or simply collects the data for further use. The surface of interest may be the undercarriage of a vehicle, a surface of "product" at any orientation in a manufacturing process, the interior of a borehole or pipe, etc. The contrast enhancer 104 may be an integral part of a preferred embodiment of the present invention itself or an attachment thereon. To facilitate the "inspection" function, a database 120 of known, desired, or "expected" surface contours is made available through the control 105. Finally, in certain applications, such as entry or exit control, it is advantageous to know vehicle description, speed, and position, thus a device (or devices) 106 that determines these may be provided as an option.

Unlike conventional applications of phase profilometry, in a preferred embodiment of the present invention, energy of different characteristics than ambient energy may be directed to and reflected from a surface of interest without need for the energy to exhibit periodicity, e.g., a single bar of light may be scanned.

Similar to a scanning laser beam, a preferred embodiment of the present invention provides a representation (image) of an area rather than that of a point or a line. Unlike a laser system, it has no moving parts, although its orientation may be adjusted to optimize coverage. Further, the possibility of using non-coherent light sources eliminates a safety hazard inherent in laser usage.

Takeda and Mutoh present a method termed "Fourier Transform Profilometry." Using this method, surface profiles are derived using periodic shadows cast onto a surface. It is the method adapted, not copied, for use in a preferred embodiment of the present invention. Mitsuo Takeda and Kazuhiro Mutoh, *Fourier Transform Profilometry for the Automatic Measurement of 3-D Object Shapes, Applied Optics*, Vol. 22, No. 24, 15 Dec. 1983. In this method each line, (y), of the image is analyzed separately. If a line (x)

perpendicular to Ronchi grating lines of the non-deformed grid is viewed as a space versus amplitude (light intensity) plot, it would appear as square-wave. Analytically this line can be described by:

$$g(x, y) = \sum_{n=-\infty}^{\infty} A_n e^{j[2\pi \cdot f_n \cdot x + \theta_n(x,y)]} \tag{1}$$

where:
$j = (-1)^{1/2}$
f=frequency, and
θ=phase angle

If a surface about a reference plane is illuminated by a Ronchi grid (or a single scanned "bar" or "line"), a deformed grid (or deformed bar or line) will result where irregularities (formations not wholly within the reference plane) exist in the surface. When each line of a deformed grid is filtered and multiplied by the complex conjugate of the corresponding line in the "flat" reference plane, the result is:

$$g_{filtered}(x, y) \cdot g'_{REF(filtered)}(x, y) = |A_0|^2 r(x, y) \cdot e^{j\Delta\phi(x, y)} \tag{2}$$

where:
$g'_{REF(filtered)}(x, y)$=the complex conjugate of $g_{REF(filtered)}(x, y)$
$\Delta\phi(x, y) = \phi_0(x, y) - \theta_0(x, y)$, i.e., the change in phase caused by the change in elevation of the surface.

Taking the log of this product yields:

$$\log[|A_0|^2 r(x, y)] + j\Delta\phi(x, y) \tag{3}$$

The imaginary part yields the change in phase, $\Delta\phi(x, y)$.

Figure 2A:
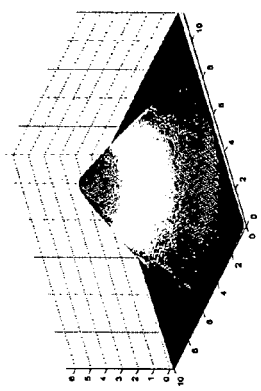
FIG. 2A is a representation of an inverted cone as translated to a 3-D image by using a Ronchi grid.
Figure 2B:
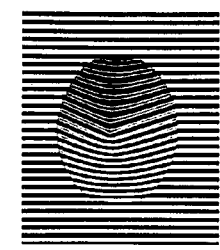
FIG. 2B is a representation of the inverted cone of FIG. 2A as it appears after processing using a preferred embodiment of the present invention.

One application of simple phase profilometry uses periodic shadows from visible light falling onto a surface to measure that surface's topography. Refer to FIG. 2A showing an image of an inverted cone "generated" by passing light through a Ronchi grid to create a periodic shadow as it appears when viewed from a position offset in angle from the illumination source. Using a preferred embodiment of the present invention to mathematically manipulate the collected data, this inverted cone may be represented as shown in FIG. 2B. That is, an observer, offset in angle from the light source, sees a modulation of the shadows caused by changes in surface elevation. The change in phase between the modulated (observed offset from the illuminator) and un-modulated (observed in a direct line with the illuminator) shadow patterns may be used to calculate the surface elevation and accurately represent it as in FIG. 2B.

Phase profilometry employs a structured shadow (or, alternatively, bands of light) to facilitate display of surface topography as "image" data relating to the surface area collected. This occurs in the same amount of time and in a manner similar to taking video of the structure with a video camera. One or more lines or bars of electromagnetic energy, preferably broadband light, are projected onto a surface to be profiled, preferably as a shadow pattern. Only one line is needed in cases where either the illuminator/collector or structure being illuminated is moving. An alternative embodiment uses a periodic pattern of lines or bars of electromagnetic energy. Height (depth) differences in the surface of the structure thus "illuminated" deform the bar(s) or line(s) impinging on the surface.

Figure 5:
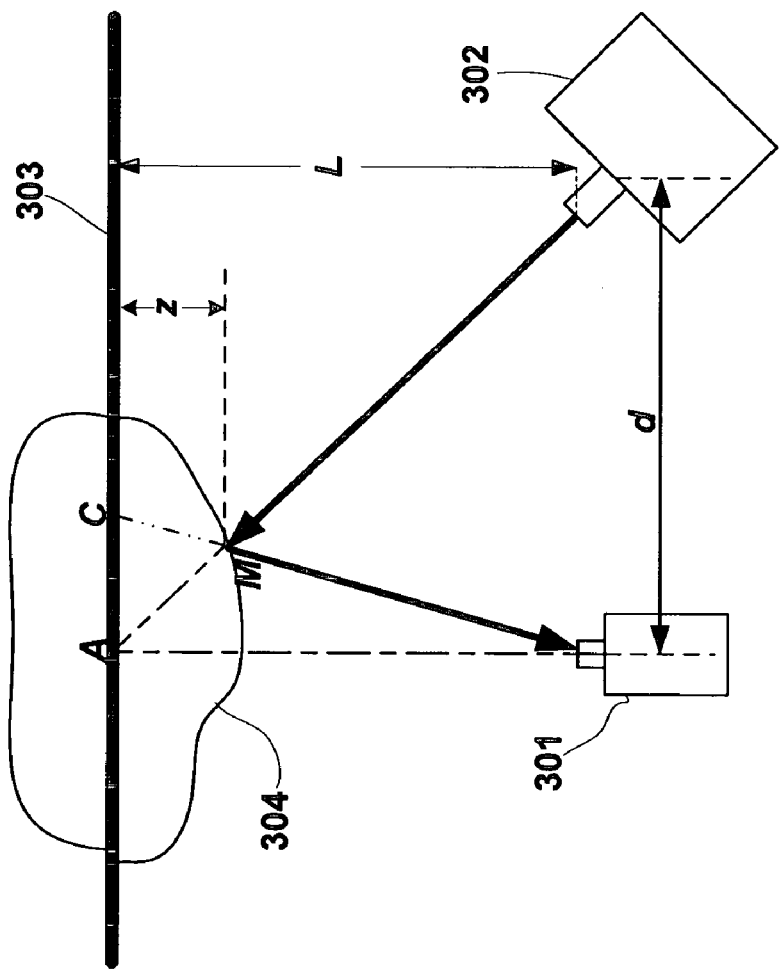
FIG. 5 is another possible configuration of the relative positions of devices used with a preferred embodiment of the present invention, simplified for illustration.

Refer to FIG. 5. In a preferred embodiment of the invention's phase profilometry process, a camera 301 and projector 302 are separated from each other by a distance, d. They are located a distance, L, from an arbitrary reference plane 303, and a grid of $f_0$ cycles of electromagnetic energy per unit distance is projected in the direction of the reference plane 303, where $f_0$ is $\geq 1$. In one embodiment, broadband light, modulated by the grid (not shown separately) to create one or more "shadow bars," travels from the projector 302 to point A on the reference plane when no object is present and is then recorded by the camera 301. When an object 304 is placed in front of the reference plane, the light strikes the object 304 at location M.

When the camera 301 views this change, it appears that the grid (not shown separately) has moved to point C on the reference plane. To understand the 3-D measurements, consider the example of one pixel when there is no structure to be measured in the scene, i.e., only the arbitrary reference plane is present. The relationship between the distance, AC, and the change in phase of the grid ($\Delta\phi$) from its reference plane value at this point is given by:

$$\Delta\phi = -2\pi \cdot AC \cdot f_0 \tag{4}$$

or, $$AC = -\frac{\Delta\phi}{2\pi \cdot f_0}. \tag{5}$$

The object of these measurements is to obtain z, the height, at each pixel on the image. Notice that the triangle formed by the camera 301, the projector 302, and M, and the triangle formed by A, C, and M, are similar triangles. The heights of these triangles are then proportional to the sides d and line AC, as given in the formula:

$$\frac{d}{AC} = \frac{L-z}{z}. \tag{6}$$

By substituting the calculated value of the line AC and solving for z, we obtain the profilometry formula:

$$z = \frac{L \cdot \Delta\phi}{\Delta\phi - 2\pi \cdot d \cdot f_0}. \tag{7}$$

This formula relates the phase of each pixel to the geometry of the profilometry setup so that the "elevation" distance, z, may be calculated. When this type of profilometry is used, the deformed grid, i.e., distorted lines, and the 2-D "undistorted" or "on-line" image are separated from each other so that the phase of the grid may be measured and used to calculate the depth (elevation) at each pixel of the image. Additionally, intra- and inter-frame geometrical line tracking are used to eliminate the inherent $2\pi$ phase-jump problem.

It can be seen from Eqn. (7) that the error in z will vary linearly with L. Errors in $f_0$ or d will also cause errors in z, but not linearly. It is important to know these parameters as exactly as possible. The major contributor to error is the measurement of the phase change, $\Delta\phi$.

The phase profilometry calculations in Eqn. (4) require a complex signal, $e^{j\omega(\theta)t}$, but a single bar or the Ronchi grating lines provide only the real signal, $\cos(\omega(\theta)t)$. When working with a finite data segment from t=0 to T, i.e., the inverse of the pre-specified data sampling rate, the Fourier Transform of a complex signal will be:

$$X(\omega) = \int_{-\infty}^{\infty} (u(t) - u(t-T)) \cdot (e^{j\omega\theta t} \cdot e^{-j\omega t}) dt \qquad (8)$$

$$X(\omega) = \frac{\sin(\omega(\theta) - \omega)T}{(\omega(\theta) - \omega)} - j\frac{\cos(\omega(\theta) - \omega)T}{(\omega(\theta) - \omega)} + j\frac{1}{(\omega(\theta) - \omega)}$$

where u(t) is the step function. Using $\cos(\omega(\theta)t)$ for the signal and taking the Fourier Transform of the finite segment yields:

$$X'(\omega) = \int_{-\infty}^{\infty} (u(t) - u(t-T)) \cdot (\cos(\omega(\theta)t) \cdot e^{-j\omega t}) dt \qquad (9)$$

$$X'(\omega) = \frac{1}{2}\left(\frac{\sin(\omega(\theta) - \omega)T}{(\omega(\theta) - \omega)} - j\frac{\cos(\omega(\theta) + \omega)T}{(\omega(\theta) - \omega)} + j\frac{1}{(\omega(\theta) - \omega)}\right) + \frac{1}{2}\left(\frac{\sin(\omega(\theta) - \omega)T}{(\omega(\theta) - \omega)} - j\frac{\cos(\omega(\theta) + \omega)T}{(\omega(\theta) + \omega)} - j\frac{1}{(\omega(\theta) + \omega)}\right)$$

The first term of $X'(\omega)$ is equal to $\frac{1}{2}X(\omega)$. Taking the Inverse Fourier Transform will yield the complex sequence needed for profilometry calculations. The difference between $2*X'(\omega)$ and $X(\omega)$ will be the error incurred by using this method to compute the complex term $e^{j\omega(\theta)t}$, such that:

$$ERROR = \frac{\sin(\omega(\theta) + \omega)T}{(\omega(\theta) + \omega)} + j\frac{\cos(\omega(\theta) + \omega)T}{(\omega(\theta) + \omega)} - j\frac{1}{(\omega(\theta) + \omega)} \qquad (10)$$

This error for positive values of $\omega$ will decrease as the length of the line T increases. The error will also decrease as $\omega(\theta)$ increases. This error is the minimum error that can be expected when the Fourier Transform is used in phase profilometry processing. For the simulations that were conducted, the RMS error was approximately 0.048%.

EXAMPLE I

In an actual military application, as part of authorizing a DoD decal for the vehicle, a baseline image of the underside of the vehicle is taken as shown in FIG. 4, contour mapped, and stored in a database. As a part of ongoing security measures, the vehicle may pass over a system embedded below a road as depicted in FIG. 5. The camera 301 and projector 302 may be located in a shallow ramp or well on, or beneath, the roadway. It employs appropriate lens systems and digital correction circuitry to adjust for lens distortion, or the camera 301 and projector 302 may be located in a deep well and use a near telecentric lens system (not shown separately) to reduce the amount of lens-induced distortion. Further, the camera 301 may be located remotely from the shallow ramp or well, using an objective lens (not shown separately) communicating with the camera via fiber optics (not shown separately). A specific technology for providing remote observation is provided in each of U.S. Pat. No. 5,619,370, *Optical System for Viewing a Remote Location*, to Guinosso, Apr. 8, 1997, and U.S. Pat. No. 4,969,707, *Fiber Optics Viewing Device*, to Hopkins, Nov. 13, 1990, both incorporated herein by reference. The determination of the best design configuration and optical parameters to give the required accuracy and speed is determined by mathematical simulations and physical tests.

This system may illuminate the underside of the vehicle using a single flash of structured light for illumination or a steady light casting a single line shadow. The single flash using a grid such as a Ronchi grid, provides a "snapshot" in time of the portion of structure illuminated at that moment. A series of single flashes may be applied to provide coverage of the understructure of a moving vehicle to provide a required pre-specified sampling rate to yield sufficient image quality for a particular purpose, e.g., security, assembly line inspection, vehicle type identification, etc. The structured light projects a mesh of illumination, such as a Ronchi grid, on the underside of the vehicle that is distorted by the contour of the vehicle's underside, whereas the constant light depends on the motion of the vehicle to create the same effect using but a single straight edge to create a single shadow alternating with light bands that is sampled at a pre-specified rate to yield required 3-D image data about the obscured structure. Knowing the vehicle's DoD decal number, the expected underside contour of the vehicle may be accessed in a database for comparison with the current contour. Analysis software aligns and compares the current contour to the stored contour and identifies differences.

For those vehicles not having a DoD decal, i.e., a cataloged underside of the vehicle or a radio tag is not detected, the vehicle type (model, make, and year) may be determined and a comparison made to a baseline image of the same model. For these vehicles, model type may be entered through a keypad (in a series of steps similar to the method used by parts locator computers at auto stores) at an entry gate by the vehicle's operator. During this effort, security personnel may also review the image of the undercarriage of the vehicle.

Figure 3:
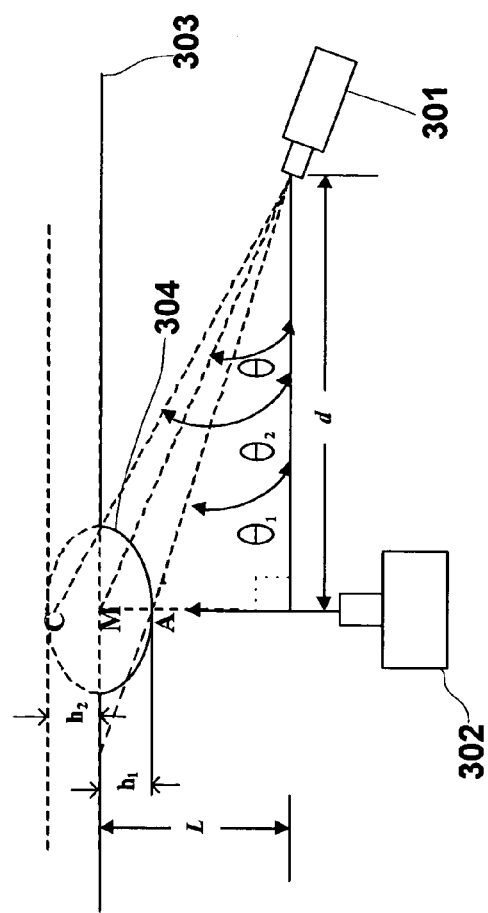
FIG. 3 is a simplified diagram showing the relative positions of devices used with a preferred embodiment of the present invention and labels for the distances and angles as related to equations mathematically describing theory behind implementation of the present invention.

Refer to FIG. 3. In a preferred alternative embodiment, the projected grid is a non-periodic shadow, such as a single bar of light or straight shadow edge, and the determination of the vehicle's undercarriage topography is made by analysis of the distortion of the non-periodic bar or shadow as the shadow moves across the undercarriage due to the motion of the vehicle. For the single straight shadow edge, the distortion of the shadow's edge is recorded as the vehicle passes over the embedded system. From the geometry it can be seen that the height, $h_1$, of a positive undercarriage feature, or depth, $h_2$, of a negative undercarriage feature is given by:

$$h_1 = d(\tan\theta - \tan\theta_1) \qquad (11)$$

and $$h_2 = d(\tan\theta - \tan\theta_2) \qquad (12)$$

where:
- $\theta$ is the angle observed for the shadow edge by the imager (e.g., a camera 301) for a flat virtual reference plane section 303, e.g., the point at M;
- $\theta_1$ is the angle observed by the imager for a positive undercarriage feature, e.g., the point at A;
- $\theta_2$ is the angle observed by the imager for a negative undercarriage feature, e.g., the point at C;
- L is the distance from the plane of the camera 302 and the illuminator 301 to the reference plane 303; and
- d is the distance from illuminator 302 to the imager 301 parallel to the direction of travel of the vehicle.

These simple relationships allow a vehicle's undercarriage to be profiled using shadows, in one embodiment a simple line or bar shadow. Note that the sign convention adopted for this particular case gives a positive value for positive undercarriage features, and a negative height for negative undercarriage features, but other sign conventions may be used.

The source of energy may be a broadband source, e.g., light that may be natural, such as that from the sun or moon, or artificial, such as that from an incandescent bulb. While a satisfactory, simple, yet robust system may be implemented using broadband visible light to cast the shadow, monochromatic and coherent (laser) light sources may also be used. In addition to light in the visible spectrum, it may be advantageous to use either UV or IR light to attain specific goals, e.g., use of IR wavelengths would enable the system to penetrate vegetation that may be covering the surface of interest and use of UV light would enable more precise measurements to be made.

In a preferred embodiment of the present invention, a shadow-based FTP system to assess obscured portions of structure comprises:
- a light source;
- a contrast enhancer in front of the light source, e.g., a grid such that a shadow is cast on the obscured surface of the structure, or an apparatus having a slit through which light passes such that a strip of light contrasting with ambient light to form a shadow is projected on the surface;
- an imager such as a digital camera; and
- a processor that receives input from the imager, compares a distorted image to an undistorted 2-D image, compares a resultant output 3-D image to a stored like or expected 3-D image, and may output to a storage device, a display, a communications system, an input to a second system such as a warning system, and any combination thereof.

EXAMPLE II

To ascertain quickly and efficiently when and where maintenance may be required in an objective and quantifiable manner, one may use a preferred embodiment of the present invention to take data on newly built or re-manufactured structure and store it for future use. Taking additional data at pre-specified intervals after the structure has been put into use, enables precise estimation of not only what needs maintenance but when it is needed. This "historic" information may be stored in a database for evaluation of the advantages of various types of configurations, expected life, lifecycle cost of a surface, contractor performance, response to operational loading and weather, and other useful management information.

EXAMPLE III

U.S. Pat. No. 6,403,966 B1, *Measurement Method and Apparatus*, to Oka, Jun. 11, 2002, and incorporated herein by reference describes a precise measurement system using a laser to measure depth of a micro-structure. The technique of the present invention could be applied to simplify the system of the '966 patent while achieving like results.

EXAMPLE IV

U.S. Pat. No. 6,198,987 B1, *Method and Multi-Functional Apparatus for Determining the Class of a Vehicle*, to Park et al., Mar. 6, 2001, and incorporated herein by reference, details a method for determining the class of a vehicle for use in automating toll collecting on toll roads, bridges and tunnels. The present invention may be used to simplify this process. For example, if used in conjunction with a "radio tag" that automatically debits an account based on the number of axles, a recreational vehicle such as an SUV may be charged one amount when towing a boat and another when not. All of this can be accomplished automatically using an embodiment of the present invention to supplement existing systems at toll booths, while also inspecting the underside for suspicious additions. This could be critical to preventing terrorist bombings in tunnels and on bridges where a bomb has been added unbeknownst to the vehicle operator.

Although specific types of phase and shadow profilometry are discussed, other similar configurations or methods, including those that may have only some of the constituents or steps used in the above examples, may be suitable for identifying and comparing three dimensions of structure and thus fall within the ambit of a preferred embodiment of the present invention as provided in the claims herein.

We claim:

1. A method for determining the 3-D configuration of obscured portions of a structure in motion comprising:
   - employing a source of electromagnetic energy to project electromagnetic energy;
   - employing a device to modulate said projected electromagnetic energy;
   - establishing contrasting portions of electromagnetic energy on said structure by utilizing projections from said source of electromagnetic energy as modulated by said device;
   - providing a collector positioned off-axis from said source;
   - moving said obscured portions of structure adjacent said at least one device in one direction at a time,
   wherein, as seen by said collector, said projecting of said directed electromagnetic energy results in at least one distorted portion of reflections of said directed electromagnetic energy from said structure wherever said structure has a vertical component perpendicular to the plane parallel to the direction of movement of said structure;
   - using said at least one off-axis collector to collect, at a pre-specified sampling rate, said reflections from said structure;
   - providing at least one pre-specified algorithm; and
   - using said at least one pre-specified algorithm, processing said reflections, wherein said processing yields at least one three dimensional representation of said obscured structure.

2. The method of claim 1 employing said source operating at a wavelength selected from the group consisting of: visible electromagnetic waves of a single frequency, visible electromagnetic waves operating at multiple frequencies, invisible electromagnetic waves of a single frequency, invisible electromagnetic waves operating at multiple frequencies, and any combination thereof.

3. The method of claim 2 employing wavelengths selected from the group consisting of: broadband visible light, broadband invisible light, non-coherent x-rays, broadband ultraviolet light, broadband infrared light, non-coherent radar waves, non-coherent radio waves, and combinations thereof.

4. The method of claim 2 employing wavelengths selected from the group consisting of: coherent visible light, coherent invisible light, coherent x-rays, coherent ultraviolet light, coherent infrared light, coherent radar waves, coherent radio waves, and combinations thereof.

5. The method of claim 1 employing contrasting portions comprising at least one set of images of said structure, said set having a first image of an illumination band and a second image of a non-illumination band,
wherein said illumination band and said non-illumination band are parallel and multiple said sets are parallel one to the other said sets.

6. The method of claim 1 employing a camera as said at least one off-axis collector.

7. The method of claim 1 employing a digital camera as said at least one off-axis collector.

8. The method of claim 1 employing processing further comprising:
   converting any said collected reflections that are analog to digital format;
   performing a Fast Fourier Transform (FFT) of said collected reflections, as provided in digital format, to yield FFT data;
   filtering said FFT data about the fundamental spectral frequency of said modulated electromagnetic energy in the direction transverse to the direction of movement of said structure; and
   employing said at least one complex algorithm to extract at least one change in phase of said modulated electromagnetic energy.

9. The method of claim 8 wherein said change in phase is related to changes in said vertical component of the dimension of said structure, z, by the relationship:

$$z(x, y) = \frac{L \cdot \Delta\theta}{\Delta\theta - 2\pi \cdot f \cdot d}$$

where:
   $\Delta\phi$=change in phase
   f=instantaneous frequency with respect to distance of said electromagnetic energy
   d=interplanar distance between said collector and said device where each are located in the same plane
   L=distance between said collector and an arbitrary reference surface
wherein after processing a single frame of said reflections, an ordered triplet (x, y, z) is established for concurrent use or archives, and
wherein multiple said ordered triplets may be used or displayed concurrently with employment of said method.

10. A system for determining the 3-D configuration of obscured portions of structure in motion, comprising:
   at least one device for modulating electromagnetic energy in a pre-specified form,
wherein said structure is moved adjacent said at least one device while maintaining physical separation therefrom, and
wherein said device enhances the contrast of said electromagnetic energy impinging on said structure;
   at least one collector for acquiring, at a pre-specified sampling rate, electromagnetic energy reflected from said structure and providing said acquired electromagnetic energy as output, and
   at least one processor, having an input and an output, in operable communication with said at least one collector for manipulating said output of said at least one collector.

11. The system of claim 10 at least part of which is embedded in or below a surface over which said structure moves.

12. The system of claim 10 in which said at least one collector comprises at least one objective lens in operable communication with at least one imager remotely located from said at least one objective lens,
wherein said objective lens is embedded in or below said surface over which said structure moves.

13. The system of claim 12 in which said at least one imager is in operable communication with said at least one objective lens via a means selected from the group consisting of: coaxial cable, fiber optic cable, wireless transmissions, and combinations thereof.

14. The system of claim 10 in which said at least one processor provides an interface to at least one second system.

15. The system of claim 10 in which said at least one processor incorporates a control function for both collecting and processing said collected electromagnetic energy.

16. The system of claim 10 in which said at least one collector is at least one imager.

17. The system of claim 16 in which said at least one imager is a camera.

18. The system of claim 17 in which said camera is a digital camera.

19. The system of claim 10 further comprising a control separate from said at least one processor.

20. The system of claim 19 in which said control facilitates accessing and comparing data from a database with said output of said at least one processor, and storing, manipulating, and reporting said output of said at least one processor.

21. The system of claim 10 in which said system implements a function selected from the group consisting essentially of: access control, configuration identification, security inspection, quality control, safety inspection, automated toll collection, commercial vehicle inspection, and combinations thereof.

22. The system of claim 10 in which said electromagnetic energy is provided at a wavelength selected from the group consisting of: visible electromagnetic waves of a single frequency, visible electromagnetic waves operating at multiple frequencies, invisible electromagnetic waves of a single frequency, invisible electromagnetic waves operating at multiple frequencies, and any combination thereof.

23. The system of claim 10 in which said electromagnetic energy is provided as light in a form selected from the group consisting of: non-coherent visible light, non-coherent infrared (IR) light, non-coherent ultraviolet (UV) light, coherent visible light, coherent infrared (IR) light, coherent ultraviolet (UV) light, and any combination thereof.

24. The system of claim 10 further comprising at least one display in operable communication with said processor.

25. The system of claim 10 further comprising at least one source of electromagnetic energy.

26. A system that determines the 3-D configuration of obscured parts of structure in motion and compares it to an expected 3-D configuration of said structure, comprising:
   at least one device for directing electromagnetic energy in a pre-specified form to said structure,
wherein said structure is moved over said at least one device while maintaining physical separation therefrom, and
wherein said device enhances the contrast of said electromagnetic energy impinging on said structure;
   at least one collector for acquiring, at a pre-specified sampling rate, electromagnetic energy reflected from said structure and providing said acquired electromagnetic energy as output;
   at least one processor, having an input and an output, in operable communication with said at least one collector for manipulating said output of said at least one collector;
   at least one database, stored so as to be accessible from at least said at least one processor, containing at least one configuration of at least one said expected structure; and at least one controller that facilitates storing, manipulating, and reporting said output of said processor, and comparing at least one of said at least one configurations with said output, wherein at least part of said system is embedded in or below a surface over which said structure moves.

27. A system that facilitates the conduct of large scale 3-D modeling of the surface of structure in motion, comprising:

at least one device for directing electromagnetic energy in a pre-specified form to said structure, wherein said structure is moved over said at least one device while maintaining physical separation therefrom, and wherein said device enhances the contrast of said electromagnetic energy impinging on said structure;

at least one collector for acquiring electromagnetic energy reflected from said structure and providing said acquired electromagnetic energy as output;

at least one processor, having an input and an output, in operable communication with said at least one collector for manipulating said output of said at least one collector; and at least one controller that facilitates storing, manipulating, and reporting said output of said processor, wherein at least part of said system is embedded on or in a surface over which said structure moves.

* * * * *